(12) United States Patent
McCarson

(10) Patent No.: US 12,737,415 B2
(45) Date of Patent: Sep. 15, 2026

(54) HYPOTHESIS GENERATION AND TESTING SYSTEM (HGTS) FOR GENERATIVE AI, AGENTIC AI, CONTEXTUAL AI CORRELATION ANALYSIS, ITERATIVE SELF-LEARNING SYSTEMS AND ARTIFICIAL GENERAL INTELLIGENCE (AGI) FRAMEWORKS

(71) Applicant: AIECONOMY LLC, Tempe, AZ (US)

(72) Inventor: Brian McCarson, Chandler, AZ (US)

(73) Assignee: AIECONOMY LLC, Tempe, AZ (US)

( * ) Notice: Subject to any disclaimer, the term of this patent is extended or adjusted under 35 U.S.C. 154(b) by 0 days.

(21) Appl. No.: 19/351,192

(22) Filed: Oct. 6, 2025

(65) Prior Publication Data

US 2026/0037573 A1 Feb. 5, 2026

Related U.S. Application Data

(63) Continuation-in-part of application No. 17/840,390, filed on Jun. 14, 2022, now abandoned, which is a
(Continued)

(51) Int. Cl.
*G06F 16/907* (2019.01)
*G06F 16/587* (2019.01)
(Continued)

(52) U.S. Cl.
CPC .......... *G06F 16/587* (2019.01); *G06F 16/907* (2019.01); *G06F 18/2133* (2023.01);
(Continued)

(58) Field of Classification Search
CPC .. G06F 16/587; G06F 16/907; G06F 18/2133; G06F 18/29; G06F 18/24155;
(Continued)

(56) References Cited

U.S. PATENT DOCUMENTS 7,000,357 B1 2/2006 Stearns et al.
8,379,913 B1 2/2013 Robinson et al.
(Continued)

FOREIGN PATENT DOCUMENTS

WO 2025006538 A1 1/2025
WO 2025212965 10/2025
WO 2025212965 A1 10/2025

OTHER PUBLICATIONS

Atkinson-Abutridy, John, Chris Mellish, and Stuart Aitken. "A semantically guided and domain-independent evolutionary model for knowledge discovery from texts." IEEE Transactions on Evolutionary Computation 7.6 (2004): 546-560. (Year: 2004).*
(Continued)

*Primary Examiner* — Randall K. Baldwin
(74) *Attorney, Agent, or Firm* — Daniel R. Pote

(57) ABSTRACT

A Hypothesis Generation and Testing System (HGTS) includes a framework for enabling artificial intelligence (AI) systems to autonomously formulate, test, refine, and store hypotheses using structured experimental workflows. HGTS may integrate with, but operates independently from, traditional databases, model repositories, context-aware AI databases and the like to provide a persistent, traceable, and interpretable record of hypothesis lifecycles. The system incorporates a probationary hypothesis database for unverified ideas, a validation engine for controlled experimentation, a confidence scoring and lifecycle management agentic subsystem for hypothesis evaluation, and recursive learning agents that iteratively refine models and experimental methods. Modular agents autonomously propose, test, and document hypotheses using statistical, symbolic, and deep learning techniques. The system ranks outcomes and retains full contextual metadata, enabling reproducible discovery. HGTS thereby provides a foundational mechanism for
(Continued)

reproducible, interpretable, and self-directed intelligence, forming a cornerstone technology for artificial general intelligence (AGI).

21 Claims, 4 Drawing Sheets

Related U.S. Application Data continuation of application No. 16/797,640, filed on Feb. 21, 2020, now Pat. No. 11,361,202.

(51) Int. Cl.

| | |
|---|---|
| ***G06F 18/20*** | (2023.01) |
| ***G06F 18/2133*** | (2023.01) |
| ***G06F 18/2415*** | (2023.01) |
| ***G06N 3/08*** | (2023.01) |
| ***G06N 7/01*** | (2023.01) |
| ***G06V 10/764*** | (2022.01) |
| ***G06V 10/84*** | (2022.01) |
| ***G06V 20/10*** | (2022.01) |
| ***G06V 20/13*** | (2022.01) |
| ***G08G 1/01*** | (2006.01) |
| ***G08G 3/00*** | (2006.01) |
| ***G08G 5/20*** | (2025.01) |

(52) U.S. Cl.

CPC ........ *G06F 18/24155* (2023.01); *G06F 18/29* (2023.01); *G06N 3/08* (2013.01); *G06N 7/01* (2023.01); *G06V 10/764* (2022.01); *G06V 10/84* (2022.01); *G06V 20/13* (2022.01); *G06V 20/188* (2022.01); *G08G 1/0133* (2013.01); *G08G 3/00* (2013.01); *G08G 5/20* (2025.01)

(58) Field of Classification Search

CPC .... G06V 10/84; G06V 10/764; G06V 20/188; G06V 20/13; G06N 7/01; G06N 3/08; G08G 5/20; G08G 1/0133; G08G 3/00; G01N 33/68; G01N 33/6896; G01N 2800/52; A61P 25/00; A61K 31/4045; C12Q 1/37; C12Q 1/6883; C12Q 2600/178; C12Q 2600/158; C12Q 2600/136; C12Q 2525/207; C12Q 2521/337

See application file for complete search history.

(56) References Cited

U.S. PATENT DOCUMENTS

| | | | | |
|---|---|---|---|---|
| 11,361,202 | B2 | 6/2022 | McCarson | |
| 12,086,178 | B2 | 9/2024 | McCarson | |
| 12,088,599 | B1 | 9/2024 | McCarson | |
| 12,632,495 | B2 | 5/2026 | McCarson | |
| 2008/0162182 | A1 | 7/2008 | Cazares et al. | |
| 2013/0024125 | A1 | 1/2013 | Lystig et al. | |
| 2016/0224894 | A1* | 8/2016 | Soon-Shiong | G06F 16/951 |
| 2017/0024659 | A1* | 1/2017 | Stromsten | G06F 16/24578 |
| 2017/0041874 | A1 | 2/2017 | Jarosinski et al. | |
| 2017/0369162 | A1 | 12/2017 | Alzahrani | |
| 2018/0137454 | A1 | 5/2018 | Kulkarni et al. | |
| 2018/0198831 | A1 | 7/2018 | Calcaterra et al. | |
| 2019/0147305 | A1 | 5/2019 | Lu et al. | |
| 2019/0250839 | A1 | 8/2019 | Bedadala et al. | |
| 2019/0332863 | A1 | 10/2019 | Abhishek et al. | |
| 2019/0391578 | A1 | 12/2019 | Tariq et al. | |
| 2020/0156632 | A1 | 5/2020 | Ding et al. | |
| 2020/0299988 | A1 | 9/2020 | Newman | |
| 2021/0264225 | A1 | 8/2021 | McCarson | |
| 2022/0318577 | A1 | 10/2022 | McCarson | |
| 2023/0161181 | A1 | 5/2023 | Chi | |
| 2023/0289381 | A1 | 9/2023 | McCarson | |
| 2023/0342392 | A1 | 10/2023 | McCarson | |
| 2024/0256598 | A1 | 8/2024 | McCarson | |
| 2024/0265047 | A1 | 8/2024 | McCarson | |
| 2024/0346342 | A1* | 10/2024 | Lewis | G06N 3/044 |
| 2024/0419706 | A1* | 12/2024 | Gutierrez | G06F 40/166 |
| 2025/0061377 | A1* | 2/2025 | Ngo | G06N 20/10 |
| 2025/0190460 | A1* | 6/2025 | Madisetti | G06F 16/24539 |
| 2025/0200108 | A1 | 6/2025 | McCarson | |
| 2025/0200208 | A1* | 6/2025 | Roper, Jr. | G06F 16/93 |
| 2025/0244964 | A1* | 7/2025 | Mystetskyi | G06F 8/65 |
| 2025/0258774 | A1* | 8/2025 | Sun | G06N 3/09 |
| 2025/0259043 | A1* | 8/2025 | Crabtree | G06N 3/042 |
| 2025/0278526 | A1* | 9/2025 | Roper, Jr. | G06F 30/15 |
| 2025/0371074 | A1 | 12/2025 | McCarson | |
| 2026/0037573 | A1 | 2/2026 | McCarson | |

OTHER PUBLICATIONS

Queralt-Rosinach, Nãºria, et al. "Structured reviews for data and knowledge-driven research." Database 2020 (2020): baaa015. (Year: 2020).*

Silva, Kelson, et al. "ArchHypo: managing software architecture uncertainty using hypotheses engineering." IEEE Transactions on Software Engineering (2024). (Year: 2024).*

Mondal, Rajdeep, et al. "Multi-agent AI System for High Quality Metadata Curation at Scale." bioRxiv (Jun. 2025): 2025-06. (Year: 2025).*

Maragheh, Reza Yousefi, and Yashar Deldjoo. "The Future is Agentic: Definitions, Perspectives, and Open Challenges of Multi-Agent Recommender Systems." arXiv preprint arXiv:2507.02097 v2 (Jul. 2025). (Year: 2025).*

Huang, Lifu, et al. "Towards Agentic Al for Science: Hypothesis Generation, Comprehension, Quantification, and Validation." Companion Proceedings of the ACM on Web Conference May 2025. (Year: 2025).*

Bazgir, Adib, and Yuwen Zhang. "Agentichypothesis: A survey on hypothesis generation using llm systems." Towards Agentic AI for Science: Hypothesis Generation, Comprehension, Quantification, and Validation (Mar. 2025). (Year: 2025).*

Singh, Hardial. "How Generative AI is Revolutionizing Scientific Research by Automating Hypothesis Generation." Available at SSRN 5267912 (Jul. 2025). (Year: 2025).*

Tang, Jiabin, et al. "AI-Researcher: Autonomous Scientific Innovation." arXiv e-prints (May 2025): arXiv-2505. (Year: 2025).*

Song, Kevin, Andrew Trotter, and Jake Y. Chen. "LLM agent swarm for hypothesis-driven drug discovery." arXiv preprint arXiv:2504.17967 (Apr. 2025). (Year: 2025).*

Zhang et al. "InternAgent: When Agent Becomes the Scientist—Building Closed-Loop System from Hypothesis to Verification." arXiv preprint arXiv:2505.16938 (Jul. 2025). (Year: 2025).*

Arslanalp et al. ("Big Data on Vessel Traffic: Nowcasting Trade Flows in Real Time: IMP Working paper", WP/19/275, Dec. 13, 2019, pp. 1-34) (Year: 2019).

Ayush et al. ("Generating Interpretable Poverty Maps using Object Detection in Satellite Images", https://arxiv.org/pdf/2002.01612v1.pdf, arXiv:202.01612v1 [cs.CV], Feb. 5, 2020, pp. 1-9) (Year: 2020).

Blazquez et al. ("Big Data sources and methods for social and economic analyses", Technological Forecasting and Social Change 130, 2018, pp. 99-113) (Year: 2016).

Cong et al. ("Alternative Data for FinTech and Business Intelligence", Available at SSRN: https://ssrn.com/abstract=3521349 or http://dx.doi.org/10.2139/ssrn.3521349, Oct. 1, 2019, p. 1-31) (Year: 2019) entire document.

Dandala et al. ("Internet of Vehicles (IoV) for Traffic Management", IEEE International Conference on Computer, Communication and Signal Processing (ICCCSP-2017), 2017, pp. 1-4) (Year: 2017).

Fedorov et al. ("Traffic flow estimation with data from a video surveillance camera", Journal Big Data, 6:73, 2019, pp. 1-15) (Year: 2019).

(56) References Cited

OTHER PUBLICATIONS

Hu et al. ("Improved monitoring of urbanization processes in China for regional climate impact assessment", Environ Earth Sci 73, pp. 8387-8404, 2015) (Year: 2015).

Joseph et al. ("A novel vessel detection and classification algorithm using deep learning neural network model with morphological processing (M-DLNN)", Soft Computing 23, 2019, pp. 2693-2700) (Year: 2019).

Kolanovic et al. ("Big Data and AI Strategies: Machine Learning and Alternative Data Approach to Investing", JP Morgan, Global Quantitative and Derivatives Strategy, May 18, 2017, pp. 1-280) (Year: 2017).

Li et al. ("Estimation of regional economic development indicator from transportation network analytics", Scientific reports, 10(1), Feb. 14, 2020, pp. 1-15) (Year: 2020).

Lopez-Lozano et al. ("An evaluation framework to build a cost-efficient crop monitoring system. Experiences from the extension of the European crop monitoring system," Agricultural Systems 168, 302, pp. 231-246) (Year: 2019) entire document.

Nakajima et al. ("Bayesian Analysis of Latent Threshold Dynamic Models", 2011 Seminar on Bayesian Inference in Econometrics and Statistic (SBIES), 2011 pp. 1-36) (Year: 2011).

Radford et al. ("Language Models are Unsupervised Multitask Learners", OpenAl blog, 1(8), 2019, pp. 1-24) (Year: 2019) entire document.

Saeed et al. ("Forecasting wheat yield from weather data and MODIS NDVI using Random Forests for Punjab province, Pakistan", International Journal of Remote Sensing, 38:17, 2017, pp. 4831-4854) (Year: 2017).

Search Report and Written Opinion of the ISA, Issued Aug. 29, 2024 in PCT/US2024/035527.

Suraj et al. ("On monitoring development indicators using high resolution satellite images", https://arxiv.org/abs/1712.022822,arXiv:1712.02282v3 [econ.EM] Jun. 25, 2018, pp. 1-36) (Year: 2018).

* cited by examiner

HYPOTHESIS GENERATION AND TESTING SYSTEM (HGTS) FOR GENERATIVE AI, AGENTIC AI, CONTEXTUAL AI CORRELATION ANALYSIS, ITERATIVE SELF-LEARNING SYSTEMS AND ARTIFICIAL GENERAL INTELLIGENCE (AGI) FRAMEWORKS

CROSS-REFERENCE TO RELATED APPLICATIONS

The present application is a Continuation-in-Part of U.S. Ser. No. 17/840,390,filed Jun. 14, 2022, as published under U.S. Pat. Pub. No. 2022/0318577, and entitled "Systems and Methods for Deriving Leading Indicators of Economic Activity Using Predictive Analytics," which is a Continuation of U.S. Ser. No. 16/797,640, filed Feb. 21, 2020, now U.S. Pat. No. 11,361,202 issued Jun. 14, 2022 and entitled "Systems and Methods For Deriving Leading Indicators of Future Manufacturing, Production, and Consumption of Goods and Services," the entire contents of which are hereby incorporated by reference.

TECHNICAL FIELD

The present subject matter relates, generally, to artificial intelligence systems and databases, and, more particularly, to a hypothesis generation and testing system (HGTS) driven by modular agents for advanced idea discovery and complex AI analysis. It further provides a foundational architecture supporting the emergence of artificial general intelligence (AGI) through self-directed analytical exploration.

BACKGROUND

Recent years have seen dramatic advances in the use of artificial intelligence (AI) systems, particularly agentic large language model (LLM) systems. Despite such advances, the database paradigms currently employed by such systems are unsatisfactory in a number of respects. For example, prior art systems do not fully specify how hypotheses can be dynamically created, evaluated, and refined by autonomous agentic processes. There is a long-felt need for a structured hypothesis generation and testing system (HGTS) composed of configurable agents, multi-modal analytic workflows, and metadata-rich output that can address the need for scientific, scalable reasoning embedded within AI ecosystems.

BRIEF SUMMARY

Embodiments of the present invention relate to a hypothesis generation and testing system (HGTS). The HGTS is integrated into the CAAD infrastructure, enabling seamless access to context-aware data, embeddings, and metadata. In accordance with various embodiments, the HGTS includes a modular architecture supporting autonomous agents, a model evaluation engine capable of handling x-by-y linear models, polynomial fits, symbolic regression, and deep learning models, and a hypothesis ranking engine based on statistical fit, novelty, efficiency, and explainability. The HGTS persistently documents all tested models and their associated rationale. It further enables closed-loop idea refinement and hypothesis ideation, and is fully extensible for multimodal AI systems and general intelligence workflows.

BRIEF DESCRIPTION OF THE DRAWING FIGURES

The present invention will hereinafter be described in conjunction with the appended drawing figures, wherein like numerals denote like elements, and:

DETAILED DESCRIPTION

The present disclosure relates to a hypothesis generation and testing system (HGTS) that allows hypotheses to be dynamically created, evaluated, and refined by autonomous agentic processes. The system features configurable agents, multi-modal analytic workflows, and metadata-rich output that address the need for scientific, scalable reasoning embedded within AI ecosystems.

Figure 1:
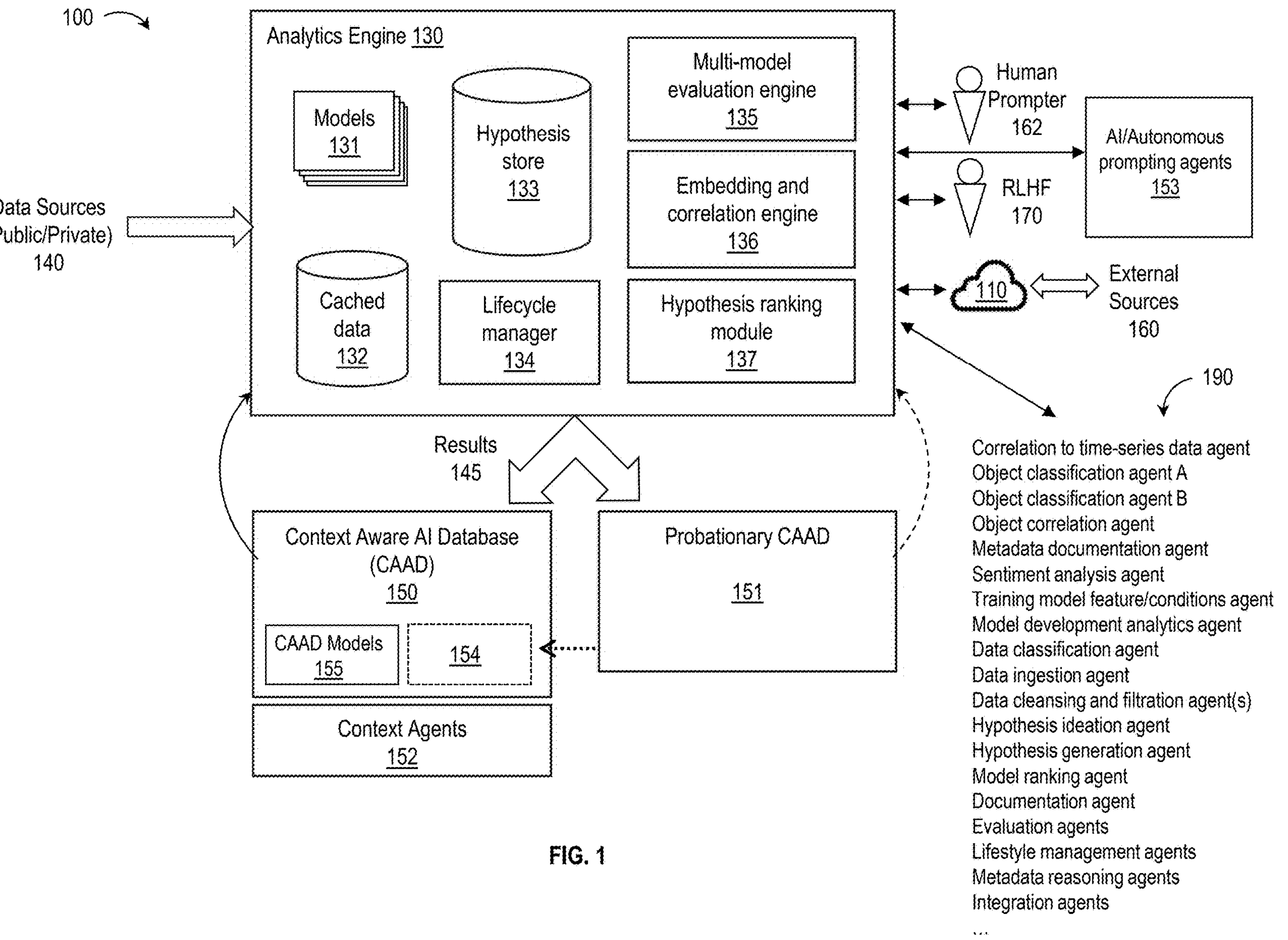
FIG. 1 is a conceptual block diagram of a hypothesis generation and testing system (HGTS) useful in describing the present invention.

Referring to the conceptual block diagram of FIG. 1, the present invention is described in the context of a hypothesis generation and testing system (HGTS) 100. As illustrated, HGTS 100 generally includes an analytics engine 130 configured to receive various data sources 140, which may be public, private, or a combination thereof. Analytics engine 130 includes a number of models (e.g., previously trained machine learning models) 131 and may include cached data 132 or in other embodiments may use data cached in CAAD or other databases. HGTS 100 further includes a hypothesis store 133, a multi-model evaluation engine 135, an embedding and correlation engine 136, a hypothesis ranking module 137, and a hypothesis lifecycle manager (or simply lifecycle manager) 134, all of which are described in further detail below. In general, analytics engine 130 is configured to employ its various submodules as illustrated to form its own hypotheses and subsequently test that hypothesis on cached data 132 and/or data sources 140 and external source 160 available over a network 110.

With continued reference to FIG. 1, system 100 includes a hypothesis store 133, which is a persistent, query-able repository of proposed hypotheses, associated test conditions, test results, and relevant evaluation metadata. An Embedding and Correlation Engine 136 is used to derive semantic embeddings of hypotheses and to evaluate correlations between features, variables, or events. A Multi-Model Evaluation Engine 135 applies statistical models, symbolic regression, and machine learning techniques to assess the validity and strength of hypotheses. A Hypothesis Ranking Module 137 scores the resulting analyses using statistical significance, $R^2$ metrics, AIC/BIC values, interpretability metrics, and other indicators of novelty. The HGTS may further comprise a databus and a dedicated API that expose hypothesis lifecycle endpoints to internal and external systems or agents.

Within this architecture, multiple modular and extensible agents 190 may be employed individually or in combination. As shown, these may include a Correlation to Time Series Data Agent that detects lags, seasonality, and autocorrelation; an Object Classification Agent A that applies supervised learning models for labeling; and an Object Classification Agent B that performs anomaly or hierarchical classification. An Object Correlation Agent analyzes inter-variable relationships using statistical and graph-based methods, while a Metadata Documentation Agent captures schema, authorship, and lineage data for hypotheses and datasets. A Sentiment Analysis Agent, powered by large language models, evaluates sentiment from unstructured textual inputs, while a Training Model Feature and Conditions Agent identifies the key features and necessary conditions that are useful for downstream model training. A Model Development Analytics Agent stores performance diagnostics, including $R^2$, MAE, and bias metrics. A Data Classification Agent labels datasets based on sensitivity and taxonomy, such as PII or operational relevance. Data Cleansing and Filtration Agents respectively prepare and screen input data to ensure analytical quality. A Hypothesis Ideation Agent is responsible for producing plausible new hypotheses using learned patterns, prior test outcomes, and contextual embeddings. A Model Ranking Agent aggregates and compares analytical outcomes by metrics such as accuracy, explainability, and efficiency. A Documentation Agent is used to persist information about model structure, hyper-parameters, and training sets. Additional agents may be integrated as needed to support novel or domain-specific analysis tasks.

Agents 190 are not merely tools for computation; they are instantiations of agentic intelligence that simulate discrete aspects of scientific reasoning. For example, ideation agents are capable of learning from failed hypotheses and generating novel propositions through analogical reasoning, semantic embedding, or latent space traversal. Correlation agents assess dependencies and structures in data through both linear and non-linear modeling methods, spanning from simple regression to deep learning. Multi-model exploration agents compare alternative modeling approaches under diverse assumptions. Contextual awareness agents ensure that hypotheses are relevant to the domain, temporal, or schema context from which they emerge More particularly, analytics engine 130 is configured to generate a hypothesis object comprising at least a set of independent variables, a dependent variable (or variables), a machine learning model (i.e., a type of model within models 131), and metadata associated therewith. CAAD 150 may further include its own CAAD models 155, as illustrated.

This hypothesis object and its associated data structure may be stored in any convenient manner known in the art (e.g., as a JSON file, data object, etc.). Thus, engine 130 is capable of performing its own planned experiments. The experimental results and conclusions of its experiments (e.g., correlation coefficients, analysis of variance, figures-of-merit, etc.) are stored along with the hypothesis object itself in a metadata format so that ongoing trends in model accuracy can be observed and utilized to further improve both model/algorithm accuracy as well as the hypothesis generating and testing system.

Upon conclusion of an experiment performed by HGTS 100, the result(s) (145) inform how the experiment is treated. Specifically, if there is a statistically significant correlation—either positive or negative (i.e., countercyclical or procyclical)—the metadata, model, cause-effect or structured event sequences, and data for that experiment are stored in context-aware artificial intelligence database (CAAD) 150. If there is a non-existent correlation (i.e., acyclical), the entire experiment may be discarded or alternatively may be stored as a null hypothesis if that improves iterative reasoning performance for future hypotheses or theory discovery. If, however, the determined correlation and/or its statistical significance are borderline or otherwise weak, then that experiment may be stored within probationary database 151 for further correlations refinement with additional hypotheses to be tested when additional computation cycles or when additional data become available. In an alternative embodiment, rather than storing experimental results in a logically separate probationary database 151, a flag system (154) is used within CAAD 150 to indicate that the particular results are probationary. This flag may be binary or may be a numerical value indicating significance. Promotion of data from probationary status either in database form or as a flag can be performed either by human in the loop (HITL), human in the middle (HITM), semi-autonomous rules engine based, or via fully autonomous determination. This mechanism emulates how human cognition remains tentative or speculative ideas without prematurely discarding them. Thus, such a probationary architecture permits AI systems to incubate weakly-supported preliminary ideas or hypotheses and allow iterative reasoning or iterative logic methods to be used to promote them once a threshold has been surpassed. Alternatively, null hypothesis can be stored permanently if that improves iterative reasoning capability by avoiding resource demands of repeatedly failed experiments. Furthermore, decay agents can be used in some embodiments to enable de-prioritization of poorly supported hypotheses over time if multiple iterations yield no improvement in correlative results or invalidated context, detected inaccuracies, recency information and the like, similar to human forgetting which can both help focus systems and can drive resource efficiency.

The system 100 includes a probationary hypothesis database 151 configured to store hypotheses generated by one or more AI agents. Each hypothesis is represented in structured form and may include fields such as: a natural language description of the hypothesis; structured causal or relational graphs representing the hypothesis; metadata describing the source of the hypothesis, including the generating agent, context features, and originating prompts; confidence scores, relevance metrics, and version identifiers; and associated evaluation results, such as experimental outcomes, accuracy measures, or validation statistics. In some embodiments, the hypothesis database 151 is logically distinct from trusted or permanent memory systems. This separation ensures that only validated and reproducible hypotheses are promoted into trusted knowledge stores such as the CAAD.

The HGTS includes a lifecycle manager 134 that orchestrates the status of each hypothesis. Hypotheses may progress through various states, including but not limited to: new, under evaluation, validated, rejected, or deprecated. Lifecycle transitions may be governed by policies such as: reinforcement through repeated validation results; decay functions wherein confidence scores decrease over time absent further support; rejection upon discovery of inconsistency, inaccuracy, or failure to reproduce; promotion into trusted memory upon exceeding defined thresholds of confidence, reproducibility, and utility. In certain embodiments, lifecycle scoring incorporates time-based heuristics, statistical analysis, cross-agent verification, and feedback from external evaluators.

Hypotheses may be generated autonomously by agents or semi-autonomously with human input. Generation may leverage various techniques, including: stochastic sampling from context-aware embeddings; causal inference algorithms applied to structured data; generative model outputs derived from large language models or multimodal AI systems; recombination of prior hypotheses into higher-order meta-hypotheses; and analogy-making processes comparing contextual domains. In some embodiments, agents may simulate alternative perspectives, belief states, or operational roles in order to generate diverse hypotheses. This approach enhances coverage of the hypothesis space and reduces systemic bias.

Testing modules are configured to evaluate hypotheses against structured datasets, simulation environments, or external information sources. Evaluation methods may include: statistical hypothesis testing and significance analysis; simulation-based prediction and counterfactual reasoning; cross-validation using partitioned data subsets; probabilistic inference and Bayesian updating; reinforcement learning environments that provide success/failure feedback. Evaluation results (e.g., 145) are logged in association with the original hypothesis and may be linked to pointers and deep pointers in CAAD. These pointers enable reproducibility by allowing evaluators to reconstruct the exact data, metadata, and context conditions under which the hypothesis was tested.

In some embodiments, HGTS 100 supports recursive loops wherein validated hypotheses become inputs for subsequent generations of hypotheses. Agents may iteratively refine, extend, or contradict prior results, thereby creating a chain of self-directed reasoning. This recursive process enables systems to autonomously explore problem spaces, discover emergent patterns, and self-improve without constant human intervention.

In certain embodiments, the Hypothesis Generation and Testing System (HGTS) 100 operates through a structured hierarchy of specialized agents as described above, each configured to perform distinct cognitive or computational functions necessary for autonomous scientific reasoning. These agents interact through standardized APIs, a shared context layer, and recursive orchestration logic, enabling the system to generate, refine, and validate hypotheses with minimal human intervention.

At the foundational level are Data Ingestion Agents, responsible for collecting raw observations, experimental data, or simulated outputs from internal or external sources. These agents normalize input data, apply quality control checks, and generate metadata describing provenance, reliability, and statistical characteristics. The outputs of Data Ingestion Agents form the evidentiary substrate for downstream hypothesis work.

Above this layer, Hypothesis Generation Agents propose candidate explanations, models, or causal relationships by leveraging multiple strategies, including stochastic sampling, analogy mapping, generative model synthesis, and symbolic reasoning. These agents are designed to operate competitively or cooperatively, thereby expanding the diversity of candidate hypotheses while avoiding premature convergence on suboptimal explanations.

The system further comprises Evaluation Agents, which test hypotheses using defined methodological frameworks such as statistical hypothesis testing, reinforcement-based simulations, Bayesian updating, or cross-validation. These agents produce structured evaluation reports containing performance metrics, reproducibility indicators, and contextual notes on boundary conditions. Evaluation Agents may also query external systems, including large language models (LLMs), simulation engines, or empirical sensors, to perform or augment hypothesis testing.

In addition, Lifecycle Management Agents govern the status of hypotheses within the hypothesis database. These agents determine when a hypothesis should be promoted from probationary to validated status, marked as rejected, or preserved as negative evidence for future reference. Lifecycle Management Agents implement decay functions, reproducibility thresholds, and cross-agent consensus protocols to ensure that the hypothesis pool remains both dynamic and trustworthy.

Higher in the hierarchy, Meta-Reasoning Agents oversee the collective behavior of the system, monitoring the efficiency, coverage, and diversity of hypothesis exploration. These agents allocate computational resources, direct focus toward unexplored hypothesis space, and enforce recursive refinement by decomposing validated hypotheses into sub-hypotheses. They may also coordinate the collaboration or competition of lower-level agents to maximize information gain and accelerate knowledge formation.

Finally, in certain embodiments, Integration Agents connect HGTS 100 with external context-aware databases (such as CAAD 150), knowledge graphs, or third-party reasoning systems. Through these Integration Agents, hypotheses and their associated metadata can be enriched with contextual "pointers" and "deep pointers" linking back to source evidence and analytical provenance. This ensures continuity of reasoning across distributed systems and enables HGTS to serve as a modular yet foundational layer within broader AGI architectures.

The HGTS 100 may be configured to support multi-agent environments wherein distinct AI agents collaborate or compete in the generation and evaluation of hypotheses. Agents may maintain individual belief states while contributing results to a shared probationary hypothesis database. In some embodiments, governance protocols such as versioning, locking, or voting mechanisms are applied to maintain consistency in multi-agent collaborations. Contradictory hypotheses may be preserved in parallel until resolved by further evaluation.

Each hypothesis and associated evaluation is annotated with detailed metadata, including: timestamps, conditions, and system state at generation; evaluation methods and parameters; data sources, model identifiers, and feature extractions; performance scores, error rates, and reproducibility measures.

Such metadata supports transparency, interpretability, and auditability of AI-driven reasoning. In certain embodiments, hypotheses and their evaluation results are structured into causal graphs or temporal event sequences to facilitate higher-order deductive reasoning.

The HGTS may be integrated with traditional data bases or Context-Aware AI Database (CAAD) 150 to provide unified context management and reasoning capabilities. Hypotheses in the probationary database may be cross-referenced with CAAD entries using pointers and deep pointers, enabling direct linkage between analytical insights and original data sources. This integration enables seamless transition of validated hypotheses into trusted long-term memory and allows CAAD to enrich its context stores with experimental knowledge produced by HGTS.

The HGTS 100 has broad applicability, including but not limited to: semi-autonomous and autonomous scientific discovery and experimentation; continuous model self-improvement and self-training; decision optimization in complex environments such as finance, healthcare, and logistics; interpretability and auditability in regulatory or safety-critical AI systems; and foundational reasoning capabilities for artificial general intelligence (AGI).

Having presented a general overview of HGTS 100, an example, non-limiting use case will now be described. In a representative use case, a Hypothesis Ideation Agent may generate a statement such as "Sales increase with social sentiment in sector X." Upon submission, the Correlation Agent applies multiple models—including polynomial regression, symbolic regression, and LSTM-based deep learning networks—to evaluate the hypothesis. The results are scored, documented by the Documentation Agent, and stored in the Hypothesis Store. If new data arrives later, Auto-Retesting Agents are triggered to re-evaluate the hypothesis, update its scores, and adapt its confidence or ranking. This creates a virtuous cycle of continuous experimentation and refinement.

The architecture disclosed here closely simulates the scientific method: it supports autonomous agents that generate hypotheses, test them across multiple competing models, rank the results, and iterate to discover new questions. The capacity to evolve its own line of reasoning, learn from prior knowledge, and transparently document outcomes supports the type of recursive, adaptive behavior that defines intelligent cognition. As such, the Hypothesis Generation and Testing System (HGTS) forms a core enabling layer for artificial general intelligence (AGI) and superintelligent frameworks. Its design directly supports scalable knowledge acquisition, self-reinforcing ideation, explainable output, and resilient memory of prior analytical paths.

With continued reference FIG. 1, the system includes a reinforcement learning from human feedback (RLHF) system 170, which is a mechanism by which reinforcement learning can be provided to one or more models 131 (and/or 155). That is, as is known in the art, human feedback may be provided to "align" the output of a model (e.g., an LLM used by any of the modules illustrated in FIG. 1) to human preferences. Such RLHF 170 procedures may be used to improve performance, optimization of prompts, and overall training accuracy. However, reinforcement learning (RL) can also be semi-autonomous rules engine based, or fully autonomous determination.

As described further detail below, hypotheses may be generated and tested by analytics engine 130 autonomously or through prompts provided by a human (e.g., human prompter 162) or various AI-based or autonomous prompting agents 153. Thus, HGTS 100 can be viewed as a generative AI system or a form of superintelligence, general artificial intelligence operating in the field of scientific research. Further information regarding HGTS 100 may be found in U.S. Pat. No. 11,093,311, entitled "Generative AI Systems and Methods for Economic Analytics and Forecasting," and 11,361,202, entitled "Systems and Methods for Deriving Leading Indicators of Future Manufacturing, Production, and Consumption of Goods and Services," the entire contents of which are hereby incorporated by reference.

Figure 2:
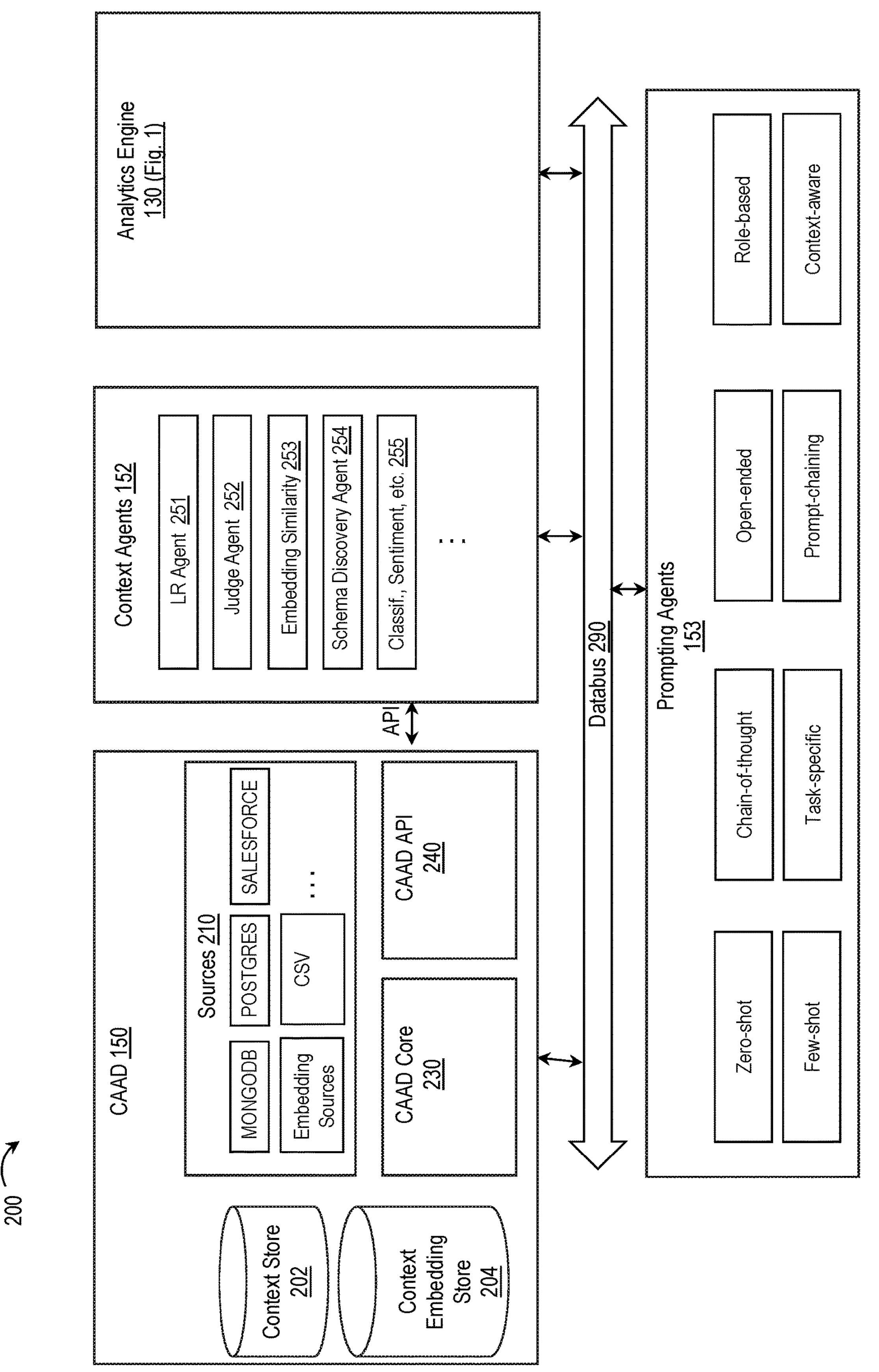
FIG. 2 is a conceptual block diagram illustrating operation of a hypothesis generation and testing system and context-aware database in accordance with various embodiments.

FIG. 2 is a conceptual block diagram illustrating, in more detail, operation of CAAD 150 in accordance with various embodiments. More particularly, system 200 includes CAAD 150, a collection of context agents 152, prompting agents 153, all of which communicate via a databus 290 and/or one or more APIs. CAAD 150 includes a context store 202, a context embedding store 204, a variety of source 210, a CAAD core 230, and a CAAD API 240.

Context agents 152 include a variety of AI agents, as that term is understood in the art, such as LR agents 251, judge agents 252, embedding similarity agents 253, schema discovery agents 254, classification/sentiment agents 255, and any other agentic entity now known or later developed. In some embodiments, the CAAD includes a context scoring module, configured to assign relevance weights to context entries based on temporal decay, accuracy, usage frequency, reinforcement learning feedback, statistical confidence, relevance to belief states, goals, policies, or objectives, or user-defined prioritization schemas. Belief states, goals, policies, or objectives can be diverse to simulate contrasting perspectives, thus enhancing reasoning diversity and completeness of global perspectives.

Prompting agents 153 include one or more agents configured to generate prompts to be used by context agents 151 and/or CAAD 150. Thus, for example, prompting agents 153 may include zero-shot agents, few-shot agents, chain-of-thought agents, task-specific agents, open-ended prompt agents, prompt-chaining agents, role-based agents, context-aware agents, and any other category of agents now known or later developed.

Figure 3:
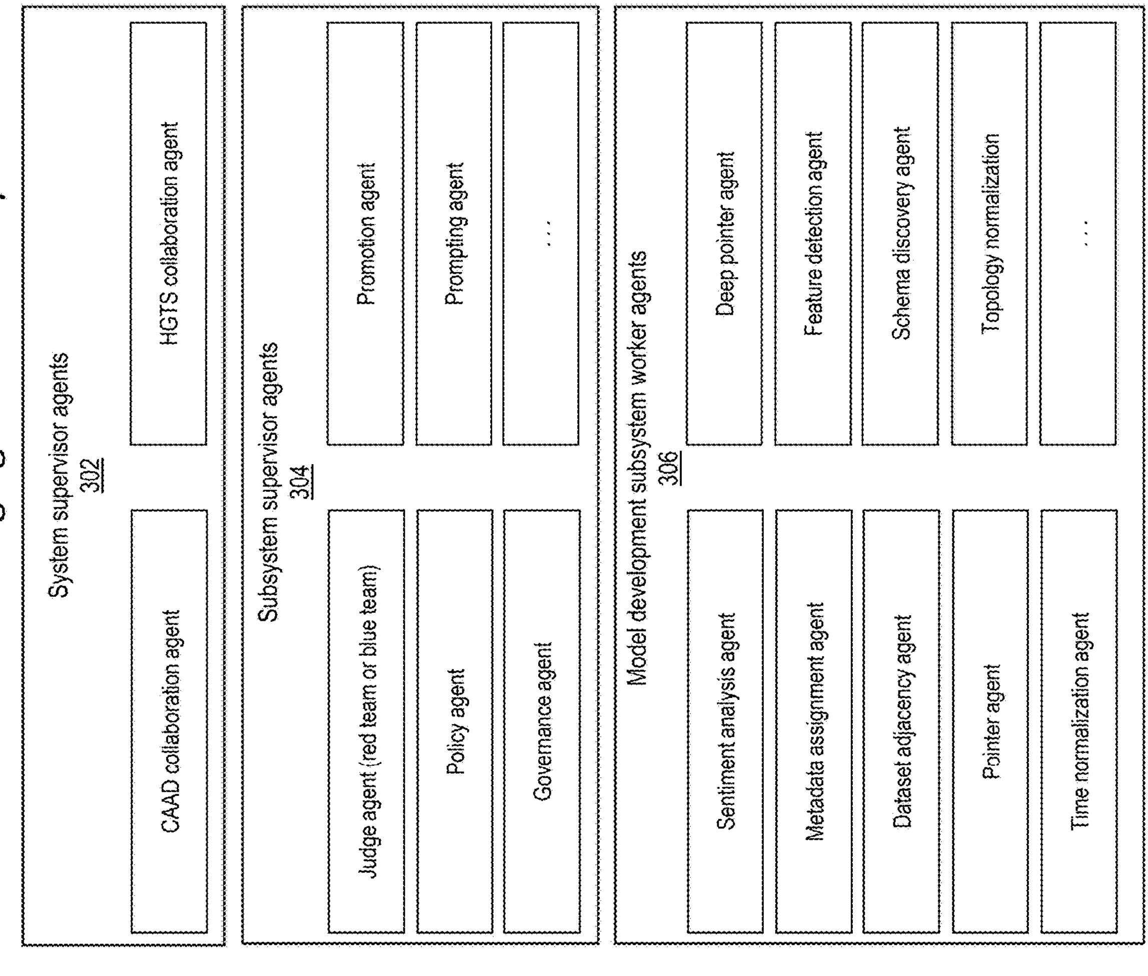
FIG. 3 is a conceptual block diagram depicting an agent hierarchy in accordance with various embodiments.

Prompting agents 153 may be configured in the form of hierarchy, such as that shown in FIG. 3, in which an agent control one or more other agents that are lower down in the hierarchy. Thus, as illustrated, a set of system supervisor agents 302 may include a CAAD collaboration agent and a HGTS collaboration agent. These agents communicate with a set of subsystem supervisor agents 304, which may include, for example, a judge agent, a policy agent, a governance agent, a total system or resource utilization or optimization agent which can be configured to optimize GPU utilization, power consumption, resource utilization, optimize cost or the like, an introspection/reflection agent which can be configured to analyze the efficacy of the iterative reasoning activities, a promotion agent, and a prompting agent. Agents can operate either independently within their hierarchy or collaboratively towards common goals or objectives and, in some embodiments, jointly contribute to a shared memory store. Shared context may include versioning, context or metadata locking, or other governance protocols to maintain consistency.

These agents 304 may in turn communicate and relay tasks to subsystem worker agents 306, such as a sentiment analysis agent, a metadata assignment agent, a dataset adjacency agent, a pointer agent, a time-normalization agent, a deep pointer agent, a feature detection agent, a schema agent, and a topology normalization agent. These worker agents 306 then interact independently or collaboratively with other components of the system illustrated in FIG. 2, such as CAAD 150 and context agents 152. In certain embodiments, multiple autonomous or semi-autonomous agents may jointly contribute to a shared context space, coordinating via agent messaging protocols, semantic embeddings, or co-authored metadata. This enables swarm-based AI cognition and team-based problem-solving across agents. Metadata agents may, in some embodiments, be assigned to look for semantic gaps in CAAD and seek out alternative correlations methods to enhance data quality as measured by correlative capabilities.

In accordance with another embodiment of the invention, the hierarchy depicted in FIG. 3 is dynamic, rather than static or immutable. There are scenarios in which an agent is be "promoted" over another depending on the application, embodiment, dynamic changes to model, and other such factors. Alternatively, multiple agents can be temporarily tasked to jointly contribute to a common set of objectives or goals supporting team-based reasoning, multi-perspective problem solving, or red-team vs blue-team type activities.

More particularly, CAAD 150 may be accessed and interfaced with using a diverse range of prompting methodologies to enable dynamic information retrieval, generation, and storage within intelligent systems. Methods of information retrieval may include, but are not limited to, vector search based retrieval via cosine or other similarity metric applied to embedding vectors as well as non-prompt based structured queries and the like. Prompting methods include, but are not limited to: (1) zero-shot prompting, wherein a model receives a direct instruction or query without prior examples; (2) few-shot prompting, which utilizes one or more input-output exemplars to condition model behavior; (3) chain-of-thought prompting, where the prompt encourages decomposition of complex reasoning tasks into sequential inferential steps; (4) task-specific instructions, which provide explicit operational objectives such as summarization, translation, classification, or content generation; (5) open-ended prompting, wherein the system is granted freedom to produce creative or exploratory responses; (6) prompt chaining, which involves a structured sequence of interdependent prompts to execute multi-step processes; and (7) role prompting, where the system is directed to assume a specific role, persona, or domain expertise to influence tone, style, or contextual alignment. Additionally, the CAAD supports context-aware prompting, in which prompts are dynamically formulated or modified based on metadata structures, contextual embeddings, or prior interaction states, enabling the model to access CAAD datasets and CAAD-trained models in a semantically coherent and context-preserving manner.

Prompting may be initiated manually by a human user (162), semi-autonomously through AI-assisted workflows, or fully autonomously via intelligent agents (153) possessing multi-modal capabilities, including but not limited to natural language, visual, auditory, and symbolic reasoning inputs and outputs. The CAAD architecture is further designed to support programmatic interfacing via a CAAD API (shown in FIG. 2), which allows HGTS 100 to both read from and write to CAAD 150—thus enabling the continuous, recursive training, contextual retrieval, and hypothesis refinement processes necessary for autonomous scientific reasoning and adaptive intelligence. CAAD augments retrieval augmented generation (RAG) systems by introducing weighted embedding spaces and context-aware ranking layers. These structures prioritize retrieval based not only on vector similarity, but also on historical model performance, agent scoring, goal or objective alignment, and hypothesis context alignment. In some embodiments, human interfaces are provided for visualizing, annotating, or debugging context flows. This includes tools for traceability (e.g., context lineage tracking), prompt influence visualization, and override mechanisms for steering model behavior. Such interfaces support regulatory compliance and explainable AI (XAI).

Figure 4:
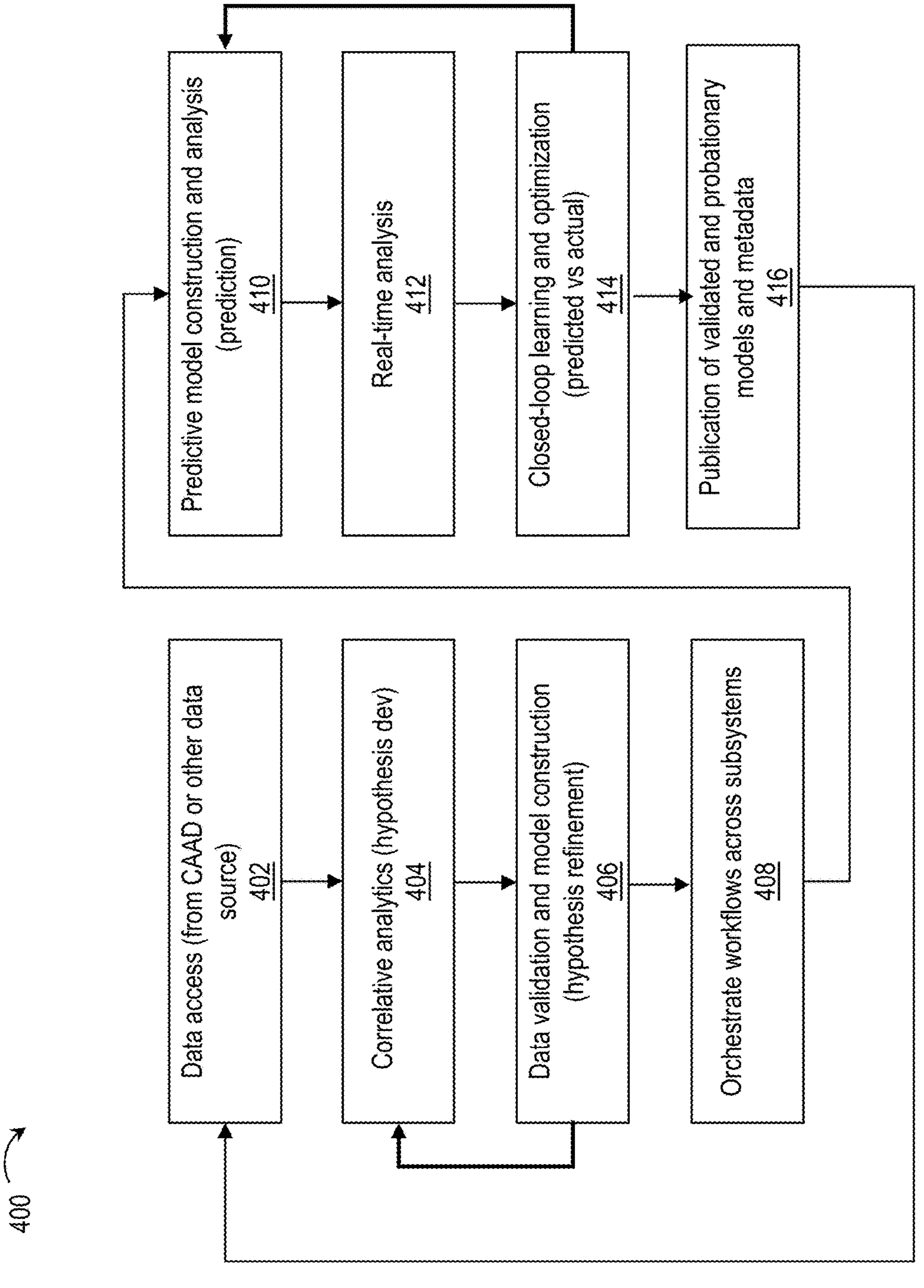
FIG. 4 is a flowchart illustrating a method in accordance with various embodiments.

FIG. 4 is a flowchart illustrating a method 400 in accordance with various embodiments. In general, utilizing the various components illustrated in FIGS. 1-3, the method involves data ingestion and encoding (step 402) (e.g., data received from data sources 140 and/or synthetic data generated by analytics engine 130 itself), followed by data processing (step 404) and data validation (step 406).

Data ingestion (step 402) involves receiving structured and/or unstructured data as described above, and data processing involves direct data processing, by applicable AI agents, to transform raw data into context-aware data. Examples of such agentic tasks include, without limitation, metadata assignment agents that tag events/entities; sentiment analysis agents to extract tone and polarity; time-normalization agents that standardize temporal data; dataset adjacency agents that connect related datasets; pointer and deep pointer agents that identify key cross-document reference, and schema discovery agents that understand new data formats.

Data validation (step 406) is performed to validate the data's context. For example, governance and policy agents can ensure compliance and coherence, prompting agents can apply any of the prompting techniques described above (e.g., as shown in FIG. 2), and scoring (judging) agents can assess confidence and risk thresholds. After which, in step 408, the workflows are orchestrated across subsystems as described herein.

Predictive model construction and analysis (step 410) includes, for example, fusing semantically enriched metadata, embedding relationships across multiple data sources, training models for context-aware prediction, using adjacent datasets (e.g., suppliers, peers), schema discovery and adjacency agents inferring likely outcomes, and recommendations using risk-adjusted scores.

Workflows are then orchestrated across subsystems as described above using, for example, system supervisor agents 302 (working in conjunction with agents 304 and 306). A predictive model is then constructed and analyzed (step 410) via analytics engine 130. This analysis may be performed in real-time (step 412) or performed asynchronously, depending upon the application and context. Finally, context evaluation for retention, decay or other lifecycle scoring, closed loop learning, goal or objective scoring, and overall system iterative learning optimization is performed (step 414) and the process continues as necessary back to data processing step 404.

While the present invention may be deployed in any number of contexts, in the interest of presenting a practical (non-limiting) implementation of the above system, we will consider an example in the domain of financial market prediction and equities trading optimization.

First, the system receives, ingests, and encodes context-aware data streams from disparate structured and unstructured sources (step 402), including historical earnings reports, company press releases, product launch announcements, financial disclosures, macroeconomic indicators, stock price movements, trading volumes, S&P 500 index trends, insider trading data, capital raise events, share buybacks, dividend changes, and the like.

The ingestion process is orchestrated by agents 306, including for example Metadata Assignment Agents, Sentiment Analysis Agents, Time Normalization Agents, Dataset Adjacency Agents, Pointer Agents, Deep Pointer Agents, and Schema Discovery Agents. These agents operate autonomously or semi-autonomously to normalize temporal sequences, extract contextual sentiment, identify relationships among disparate documents, and generate metadata and pointer descriptors referencing specific financial events, entities, and performance metrics.

Once data is ingested and tagged. Sub-System Supervisor Agents 304 such as Governance Agents, Policy Agents, Prompting Agents, and Scoring (Judge) Agents reinforce contextual correctness, regulatory alignment, and confidence thresholds. Prompting Agents 153 then execute various types of prompting, including zero-shot prompting to extract sentiment from unstructured earnings call transcripts, few-shot prompting to condition evaluations using annotated historical precedents, chain-of-thought prompting to induce model-based reasoning across time-indexed events, task-specific prompting to calculate likely market impact, and context-aware prompting to inject deep pointer-derived metadata into predictive sequences.

System Supervisor Agents 302 such as the CAAD Collaboration Agent and HGTS Collaboration Agent orchestrate macro-level workflows by coordinating with external financial data providers, GenAI models, and predictive analytics platforms. These agents generate and test hypotheses regarding the future performance of the target stock under multiple scenario paths (e.g., above-estimate earnings, competitor losses, sector downgrades, or geopolitical shifts) and activate worker agents to simulate downstream effects. Since models stored in CAAD will contain metadata context embeddings, optimal models can be pre-selected or prioritized for iterative reasoning activities, hypotheses testing, theory selection, data cleansing or other tasks. In addition to enabling differentiated iterative reasoning performance, this feature also enables optimization of activities to either improve the speed of execution, optimize resource utilization, minimize system utilization spending and the like.

Context-aware model construction occurs within the HGTS framework by aggregating and fusing the semantically enriched metadata, which now includes historical earnings context, market movements, competitor performance, and macroeconomic context. Predictive models are trained with embeddings that capture interdependencies among earnings history, investor response, and market dynamics.

Prior to the release of a scheduled earnings report, for example, the system executes speculative analysis via adjacent-industry models using Dataset Adjacency Agents and Schema Discovery Agents. The models infer probable earnings outcomes based on supplier data, industry signals, and recent peer behavior. Based on predictive thresholds and risk-adjusted scoring from Scoring Agents, the system may recommend a short or long position, which is validated through human-in-the-loop or fully autonomous channels.

Upon release of an actual press release or earnings document, real-time agents perform instantaneous ingestion and analysis. Sentiment Analysis Agents, Feature Detection Agents, and Time Normalization Agents immediately evaluate language, tone, performance metrics, and deviation from prior expectations. The system compares the release with precomputed expectations and triggers real-time prompts for execution.

If the press release is deemed materially impactful, the CAAD system 150 initiates immediate trade actions through automated or semi-autonomous interfaces. This occurs within milliseconds during regular or after-hours trading sessions, allowing the system to act ahead of market consensus and exploit arbitrage or momentum-driven opportunities.

The combination of CAAD's hierarchical agent architecture (FIG. 3), GenAI prompting methods, predictive analytics modules, and HGTS hypothesis testing processes enables a closed-loop, self-improving trading intelligence capable of performing end-to-end decisioning from ingestion to execution. This systematic framework establishes a context-aware superintelligence capable of outperforming traditional algorithmic trading systems. At step 416, context entries are evaluated for promotion, demotion, or deletion. This decision may be based on access frequency, user validation, agent scoring, or temporal thresholds. The CAAD system thus simulates a cognitive process of memory consolidation and forgetting.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field programmable gate-arrays (FPGAs), dedicated neural network devices (e.g., GOOGLE Tensor Processing Units), quantum computing, visual or image processing units, graphic processing units (GPUs), system on chips (SOCs), central processing units (CPUs), microcontroller units (MCUs), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A computer-implemented system for autonomous reasoning, comprising:

a hypothesis database configured to store a plurality of hypothesis objects, wherein each hypothesis object has a lifecycle state selected from the group consisting of at least one of: new, under evaluation, validated, rejected, and deprecated, and includes at least a set of independent variables, a set of dependent variables, a machine learning model, and metadata stored in a data structure;

a hypothesis ideation agent configured to create one or more of the hypothesis objects based on contextual information;

a hypothesis evaluation module configured to test at least one of the hypothesis objects and update the hypothesis database with results of the testing;

a plurality of agents configured to interact with the hypothesis database, the hypothesis ideation agent, and the hypothesis evaluation module; and at least one meta-reasoning agent configured to interact with the plurality of agents to perform at least one of: allocate computational resources, direct exploration of hypothesis space, iteratively fine-tune, retrain, re-weight and recursively refine hypothesis objects into sub-hypotheses.

2. The system of claim 1, wherein assignment, allocation, and prioritization of computational resources can be adjusted depending on the lifecycle state of each hypothesis object.

3. The system of claim 1, wherein the plurality of agents further comprises a lifecycle management agent configured to transition hypothesis agents between lifecycle states based on at least one of: one or more assigned goals, confidence scores, reproducibility measures, and time-based decay functions with traceability of the lifecycle state.

4. The system of claim 3, wherein the lifecycle management agent orchestrates the status of the hypothesis objects governed by a plurality of policies including at least a policy specifying reinforcement through repeated validation results.

5. The system of claim 1, wherein the hypothesis ideation agent is configured to generate hypothesis objects using at least one of: causal inference, generative model output, stochastic sampling, or analogy-making processes.

6. The system of claim 1, wherein the hypothesis evaluation module is configured to test hypothesis objects using at least one of: statistical hypothesis testing, simulation-based evaluation, reinforcement learning, probabilistic inference, autonomous, semi-autonomous or human defined goals, and cross-validation.

7. The system of claim 1, wherein the at least one meta-reasoning agent is configured to allocate computational resources, direct exploration of hypothesis space, iteratively fine-tune, retrain, re-weight and recursively refine hypothesis objects into sub-hypotheses.

8. The system of claim 1, wherein the plurality of agents further comprises integration agents configured to interface the hypothesis database with an external context-aware database or knowledge graph.

9. The system of claim 1, wherein integration agents associate each hypothesis object or evaluation result with a pointer to contextual data within a context-aware database.

10. The system of claim 1, wherein rejected hypothesis objects are preserved with associated metadata to provide negative evidence for subsequent hypothesis generation or to discard hypotheses based on decay functions, reproducibility failures or human feedback with a control interface to enable autonomous, semi-autonomous or human-in-the-loop oversight.

11. The system of claim 1, wherein hypotheses are prioritized for evaluation by meta-reasoning agents based on at least one of: predicted utility, expected information gain, iterative fine-tuning improvements, or coverage of unexplored hypothesis space.

12. A computer-implemented method for autonomous reasoning, the method comprising:

generating, by at least one processor, a plurality of hypothesis objects, wherein each hypothesis object has a lifecycle state selected from the group consisting of at least one of: new, under evaluation, validated, rejected, and deprecated, and includes at least a set of independent variables, a set of dependent variables, a machine learning model, and metadata stored in a data structure;

storing the plurality of hypothesis objects in a hypothesis database;

providing a plurality of agents and at least one meta-reasoning agent configured to interact with the plurality of agents to perform at least one of: allocating computational resources, directing exploration of hypothesis space, iteratively fine-tuning, retraining, re-weighting and recursively refining hypothesis objects into sub-hypotheses;

evaluating, by the at least one processor, at least one hypothesis object of the plurality of hypothesis objects; and updating the hypothesis database with evaluation results associated with the at least one hypothesis object.

13. The method of claim 12, further comprising promoting a hypothesis object from a probationary hypothesis database into a trusted knowledge store in response to the hypothesis satisfying one or more validation thresholds, including traceable explanations of hypothesis data for regulatory, audit or human review purposes.

14. The method of claim 12, wherein evaluating the hypothesis object comprises verifying reproducibility of prior results, achievement of assigned goal functions, reinforced learning signals, human approval or cross-agent consensus.

15. The method of claim 12, wherein recursive hypothesis layering is performed for at least one of: first-order hypotheses, meta-hypotheses of higher-order hypotheses, and refinement into sub-hypotheses.

16. The method of claim 12, wherein generating the plurality of hypothesis objects comprises simulating alternative belief states, adversarial or complimentary functions, or operational roles for one or more of the agents and recording unresolved hypotheses until categorizations are completed.

17. The method of claim 12, wherein evaluating the hypothesis object comprises associating metadata with the hypothesis, the metadata including at least one of: timestamps, model identifiers, causal graphs, temporal lineage, reproducibility measures, and evaluation parameters.

18. The method of claim 12, wherein updating the hypothesis database comprises annotating hypothesis objects with performance scores, error rates, and cross-agent verification results.

19. The method of claim 12, wherein evaluating the hypothesis object comprises applying Bayesian updating based on observed outcomes.

20. A non-transitory computer-readable medium storing instructions that, when executed by at least one processor, cause the processor to perform agentic operations comprising:

generating a plurality of hypothesis objects, wherein each hypothesis object has a lifecycle state selected from the group consisting of at least one of: new, under evaluation, validated, rejected, and deprecated, and includes at least a set of independent variables, a set of dependent variables, a machine learning model, and metadata stored in a data structure;

storing the plurality of hypothesis objects in a hypothesis database;

evaluating, using a plurality of agents, at least one hypothesis of the plurality of hypothesis objects; and updating the hypothesis database with results of the evaluation using at least one meta-reasoning agent configured to interact with the plurality of agents to perform at least one of: allocating computational resources, directing exploration of hypothesis space, iteratively fine-tuning, retraining, re-weighting and recursively refining hypothesis objects into sub-hypotheses.

21. The non-transitory computer-readable medium of claim 20, wherein the instructions further cause the processor to instantiate meta-reasoning agents configured to monitor at least one of: efficiency, diversity, reasoning functions, error rates, confidence data, coverage of hypothesis exploration, and traceable explanations of hypothesis outcomes.

* * * * *